(No Model.)
L. L. POWELL.
LADLE SUPPORT.
No. 517,293.   Patented Mar. 27, 1894.
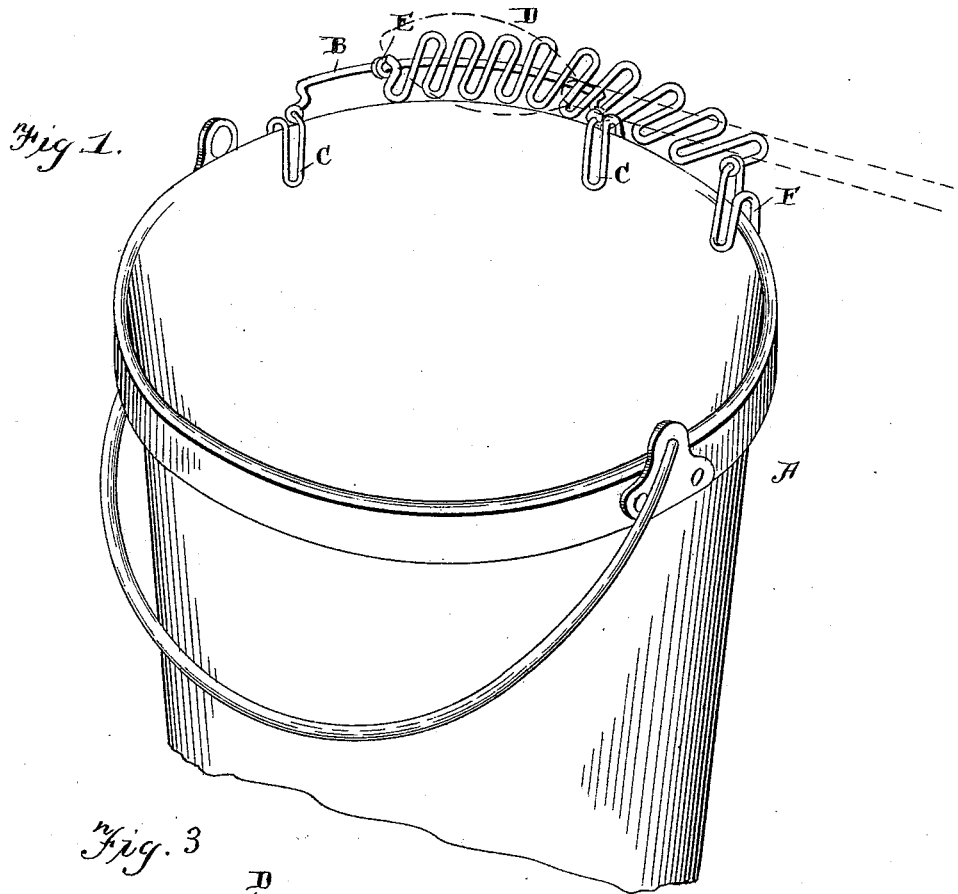
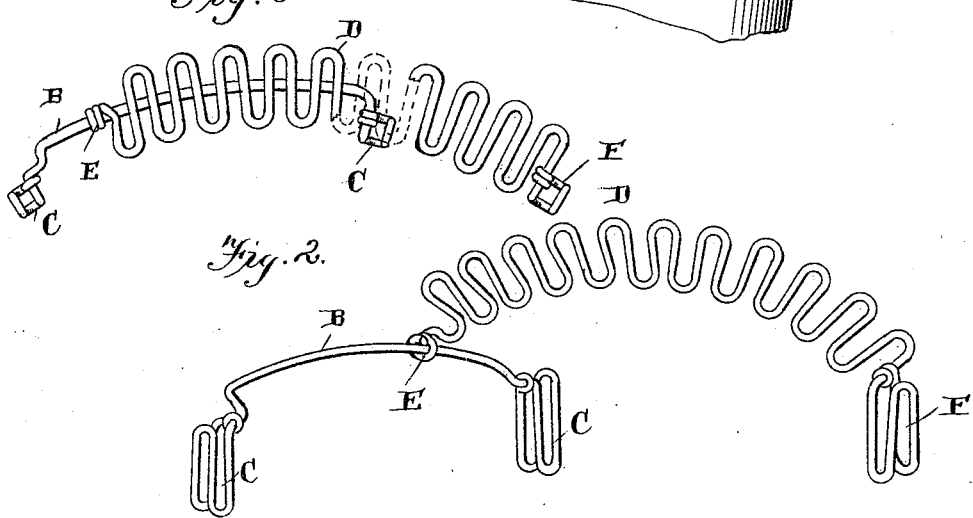
Witnesses
Geo. E. Frech
R. Taylor Hoffman
Inventor
Lucius L. Powell
By Attorneys
Lehmann Pattison & Nebh

UNITED STATES PATENT OFFICE.

LUCIE L. POWELL, OF YARDVILLE, NEW JERSEY.

LADLE-SUPPORT.

SPECIFICATION forming part of Letters Patent No. 517,293, dated March 27, 1894.

Application filed December 13, 1893. Serial No. 493,605. (No model.)

*To all whom it may concern:*

Be it known that I, LUCIE L. POWELL, of Yardville, in the county of Mercer and State of New Jersey, have invented certain new and useful Improvements in Ladle-Supports; and I do hereby declare the following to be a full, clear, and exact description of the invention, such as will enable others skilled in the art to which it pertains to make and use it, reference being had to the accompanying drawings, which form part of this specification.

My invention relates to an improved ladle support; and it consists in the novel device hereinafter fully described and claimed for supporting a stirring ladle upon a kettle when not in use.

Referring to the accompanying drawings,— Figure 1 is a perspective view of a kettle provided with my improved attachment, the ladle being supported thereby. Fig. 2 is a detached perspective view of the same. Fig. 3 is a plan view.

A designates the kettle and B a wire bent to the curvature of the kettle and having its ends bent down to form a double U—as illustrated at C, and these portions embrace the wall of the kettle as shown, thus holding wire B securely in position.

D is the curved rack for supporting the ladle, which is formed of a continuous piece of wire kinked as shown to give width to the support, and provided at its inner end with eye E which encircles wire B and upon which latter it is adapted to move, while the opposite end of the support is formed into a clasp F which engages the kettle at the desired point and in a manner similar to clasps C. Thus it will be seen that the support may be moved outward or retracted with relation to supporting wire B and there secured by clasp F. The several wires are sufficiently pliable to bend to the form of kettle upon which they are to be used. A convenient support is thus provided for the ladle when not in use.

Having thus fully described my invention, what I claim as new, and desire to secure by Letters Patent, is—

The combination of a longitudinal wire, a means for securing the same to the kettle, a ladle support, a connection between one end of the same and the wire whereby the former is adapted to move on the latter and a means for securing the opposite end of the support in position, substantially as shown and described.

In testimony whereof I affix my signature in presence of two witnesses.

LUCIE L. POWELL.

Witnesses:
CALEB S. SOUTHARD,
JESSE E. BODINE.